United States Patent
Shah et al.

(10) Patent No.: US 11,821,306 B2
(45) Date of Patent: Nov. 21, 2023

(54) OPTIMIZATION OF PULSE GENERATION PARAMETERS TO COMPENSATE FOR CHANNEL NON-LINEARITY IN MUD PULSE TELEMETRY

(71) Applicant: Halliburton Energy Services, Inc., Houston, TX (US)

(72) Inventors: Faisal Shah, Houston, TX (US); Joni Polili Lie, Houston, TX (US); Mukul M. Agnihotri, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 147 days.

(21) Appl. No.: 17/471,556

(22) Filed: Sep. 10, 2021

(65) Prior Publication Data
US 2023/0084373 A1    Mar. 16, 2023

(51) Int. Cl.
*E21B 47/20* (2012.01)
*H04B 11/00* (2006.01)
(Continued)

(52) U.S. Cl.
CPC .............. *E21B 47/20* (2020.05); *E21B 47/12* (2013.01); *E21B 47/138* (2020.05); *E21B 47/14* (2013.01);
(Continued)

(58) Field of Classification Search
CPC ........ E21B 47/20; E21B 47/12; E21B 47/138; E21B 47/14; E21B 47/18; E21B 47/24; H04B 11/00; H04B 17/104; H04B 17/309
See application file for complete search history.

(56) References Cited

U.S. PATENT DOCUMENTS 6,094,623 A * 7/2000 Mintchev ............... G06F 17/10
702/9
10,844,709 B2   11/2020 Kusuma et al.
(Continued)

FOREIGN PATENT DOCUMENTS

WO    WO 2016/095027 A1    6/2016

OTHER PUBLICATIONS

International Search Report & Written Opinion; PCT Application No. PCT/US2022/073495; dated Oct. 18, 2022.
(Continued)

*Primary Examiner* — Ian J Lobo
(74) *Attorney, Agent, or Firm* — NOVAK DRUCE CARROLL LLP

(57) ABSTRACT

Downhole telemetry systems and related methods adaptively compensate for channel non-linearity effects. To compensate for channel non-linearity, the optimum signal generation parameters are determined that produce the desired modulated pressure variation at the surface. The signal generation parameters are optimized to minimize the discrepancy between the surface detected pressure signal and the intended signal. The mud propagation channel is first estimated in light of the known modulation scheme under an ideal linear-time-invariant channel assumption. The estimated channel is used to synthesize the modulated pressure signal undergoing the mud propagation given the initial signal generation parameters. The method then varies the synthesized signal generation parameters to search for the optimal signal generation parameters. The optimal signal generation parameters are then sent over downlink channel to the downhole pulser, which is ultimately used to generate the pulse waveform.

17 Claims, 6 Drawing Sheets

(51) Int. Cl.
 *H04B 1/00* (2006.01)
 *H04B 17/309* (2015.01)
 *H04B 17/10* (2015.01)
 *E21B 47/12* (2012.01)
 *E21B 47/14* (2006.01)
 *E21B 47/24* (2012.01)
 *E21B 47/18* (2012.01)

(52) U.S. Cl.
 CPC .............. *E21B 47/18* (2013.01); *E21B 47/24* (2020.05); *H04B 1/00* (2013.01); *H04B 17/104* (2015.01); *H04B 17/309* (2015.01)

(56) References Cited

U.S. PATENT DOCUMENTS

| | | |
|---|---|---|
| 2007/0132606 A1 | 6/2007 | Reckmann et al. |
| 2008/0074948 A1 | 3/2008 | Reckmann |
| 2009/0251331 A1 | 10/2009 | Wassermann et al. |
| 2010/0307828 A1 | 12/2010 | Hutin et al. |
| 2016/0130937 A1 | 5/2016 | Logan et al. |
| 2022/0213786 A1* | 7/2022 | Jarrot .................... G06N 3/047 |

OTHER PUBLICATIONS

Mwachaka, Saleh M. et al., "A review of mud pulse telemetry signal impairments modeling and suppression methods", Journal of Petroleum Exploration and Production Technology, vol. 9, pp. 779-792, Jun. 2, 2018.

* cited by examiner

OPTIMIZATION OF PULSE GENERATION PARAMETERS TO COMPENSATE FOR CHANNEL NON-LINEARITY IN MUD PULSE TELEMETRY

FIELD OF THE DISCLOSURE

The present disclosure relates generally to downhole telemetry and, more specifically, to a method and system to compensate for channel non-linearity effects at the downhole pulser in mud pulse telemetry systems.

BACKGROUND

Mud pulse telemetry generally involves telemetry of information from a bottom location of a wellbore to a surface of the earth during oil well drilling operations. The information communicated through mud pulse telemetry can include various parameters, such as pressure, temperature, direction of the wellbore, deviation of the wellbore, density, porosity, characteristics of the wellbore layers, etc. This information can be extremely helpful for optimizing the efficiency and accuracy of a drilling operation.

Channel estimation in mud pulse telemetry aims to characterize the mud channel propagation during drilling. Mud pulse telemetry relies on accurate channel estimates to ensure robust and reliable real time telemetry for logging-while-drilling ("LWD") and measurement-while-drilling ("MWD") operations. Most often the channel estimation relies on the downhole pulser to send apriori known pseudorandom sequence of pulses. The surface telemetry system then detects this sequence and estimates its mud channel in real time.

Conventional mud-based telemetry systems are designed to operate optimally in an ideal linear-time invariant channel. A system is said to be "linear-time-invariant (LTI)" when the output is completely characterized by the convolution of its input with its impulse response. In the context of a signal propagation system where its input and output are transmitted and received signals, the propagation channel is said to be a "LTI" channel when the output signal is characterized as the convolution of its input and channel impulse response. The "channel" is a term referring to the environment in which the pressure signal carrying the data information travels from the downhole pulser to the surface pressure transducer.

However, mud propagation channel non-linearity causes these telemetry systems to operate sub-optimally because the generated pressure signal downhole is subjected to non-linear transformation during its propagation to the surface. Conventional approaches have attempted to overcome such limitation through surface filtering or surface noise removal to improve received signal-to-noise ratio. These systems rely on channel adaptation to converge to a better channel estimate. However, such approaches have failed to fully address the challenges because the convergence time is often unpredictable and may result in non-productive time.

DESCRIPTION OF ILLUSTRATIVE EMBODIMENTS

Figure 1:
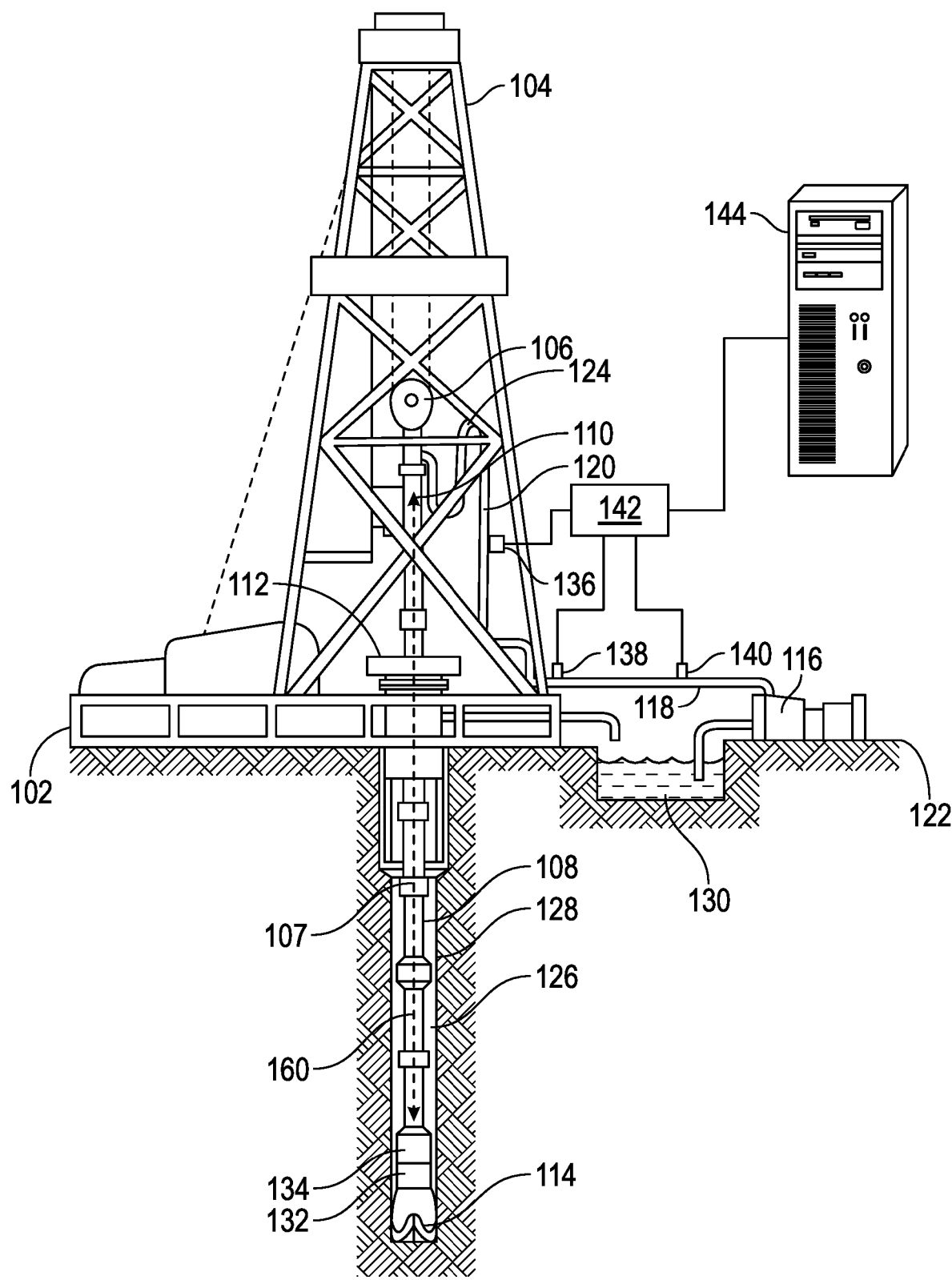
FIG. 1 shows an illustrative drilling system having mud pulse telemetry components of the present disclosure.

Illustrative embodiments and related methods of the present disclosure are described below as they might be employed in a mud pulse telemetry system and method to compensate for channel non-linearity effects. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

As will be described below, the present disclosure provides systems and related methods to compensate for channel non-linearity effects at the source of the pressure signal generation (i.e., downhole pulser). In a generalized embodiment, the system determines a signal propagation channel using a linear-time-invariant ("LTI") channel assumption and apriori knowledge of the signal modulation. The determined signal propagation channel is then used to synthesize a modulated pressure signal undergoing propagation based upon one or more initial signal generation parameters. In response to the synthesized modulated pressure signal undergoing propagation, the system varies the initial signal generation parameters to determine one or more optimal signal generation parameters. The optimal signal generation parameters are then used to generate a pulse waveform by the downhole pulser.

As previously mentioned, a mud pulse signal propagation channel may exhibit non-linearity effects resulting in a discrepancy between the downhole transmitted and surface observed pressure signals due to dynamic drilling conditions and other non-drilling mechanics, as well as self-generated wear-induced variation of the downhole pulser (pressure signal generator). Such non-linearities present challenges to surface detection for ensuring robust and reliable real time mud-based telemetry for LWD/MWD operation. Therefore, it is important for the downhole pulser to compensate for such non-linearity and provide optimal surface detection to avoid service disruption. Accordingly, the illustrative embodiments of the present disclosure propose methods for compensating channel non-linearity effects to minimize the discrepancy between the intended modulated and observed pressure variation at the surface.

Further, as also mentioned above, conventional pulse telemetry often relies on channel adaptation to converge to a better channel estimate. This convergence time is often unpredictable and may result in non-productive time. With the proposed methods, however, this is no longer required as the proposed compensation method assures the accuracy of the initial channel and subsequent channel updates if required.

Accordingly, to compensate for channel non-linearity, systems of the present disclosure determine the optimum signal generation parameters that produce the intended modulated pressure variation at the surface. Hence, the proposed method aims to optimize the pressure signal generation parameters used in the downhole pulser by minimizing the discrepancy between the observed pressure signal at the surface with its desired/intended modulated signal acquired at the surface. The method first estimates/equalizes the mud propagation channel given the apriori knowledge of signal modulation (during training or obtained from demodulation) under an ideal LTI channel assumption. The estimated channel will then be used to synthesize the modulated pressure signal undergoing the mud propagation given the initial signal generation parameters. Finally, the method then varies the signal generation parameters used in the synthesizer to search for the optimal signal generation parameters. To compensate for the channel, the updated signal generation parameters can then be sent over downlink channel to the downhole pulser, which is ultimately used to generate the pulse waveform.

FIG. 1 shows an illustrative drilling system having mud pulse telemetry components of the present disclosure. A drilling platform 102 can be equipped with a derrick 104 that supports a hoist 106. The drilling platform is supported directly on land as shown or on an immediate platform if at sea. A string of drill pipes is connected together by tool joints 107 so as to form a drill string 108. The hoist 106 suspends a top drive 110 that can rotate the drill string 108 and can lower the drill string through the wellhead 112. Connected to the lower end of the drill string 108 is a drill bit 114 that has been advanced into the earth from the earth's surface 122 to form wellbore 128. The drill bit 114 can be located at a bottom, distal end of the drill string 108 and can be rotated by rotating the drill string 108, by use of a downhole motor near the drill bit, or by a combination of each method. Drilling fluid (also referred to as "mud") can be pumped by mud pump 116 through flow line 118, stand pipe 120, goose neck 124, top drive 110, and down through the drill string 108 at high pressures and volumes to emerge through nozzles or jets in the drill bit 114. The drilling fluid can then travel back up the wellbore 128 via the annulus 126 formed between the exterior of the drill string 108 and the wall of wellbore 128. At the surface 122, the drilling fluid exits the annulus 126 through a blowout preventer (not specifically shown) and can drain into a mud pit 130 on the surface 122. On the surface 122, the drilling fluid can be cleaned and recirculated down the drill string 108 by mud pump 116.

As shown in FIG. 1, the drill string 108 can support several components along its length. In wells employing MWD or LWD, a sensor unit 132 collects data regarding the formation properties and/or various drilling parameters near the drill bit 114. The collected data can include such properties as formation fluid density, temperature, pressure, resistivity, porosity, and azimuthal orientation of the drill bit 114 or drill string 108. Furthermore, the sensor unit contains one or more transducers for measuring the pressure within the drill string 108. Other sensor units can be disposed along the drill string 108 which can be similarly enabled to sense nearby characteristics and conditions of the drill string 108, formation fluid, and surrounding formation. Regardless of which conditions or characteristics are sensed, data indicative of those conditions and characteristics is either recorded downhole, for instance at a processor within sensor unit 132 for later download, or communicated to the surface either by mud pulse telemetry, wire, wirelessly or otherwise. Power for the sensor units and communication module may be provided by batteries housed therein. Alternatively, power may be generated from the flow of drilling mud through the drill string 108 using turbines as is known in the art.

The sensor unit 132 can be coupled to a controller/communication module 134 that can transmit the collected data to the surface 122 via communication path 160. Alternatively, sensor unit 132 and communication module 134 can receive signals from the surface 122 or can transmit/receive data to or from other sensor units and communication modules disposed along the drill string 108. In wells employing mud pulse telemetry, communication module 134 can modulate the resistance to the incoming flow of drilling fluid to generate pressure pulses (positive/negative pulse systems) or a carrier frequency (continuous wave pulse system) that propagate to the surface 122. In such mud pulse telemetry systems, communication module 134 forms part of a mud pulser that generates the pulse waveforms using, for example, an electric motor. Various transducers, such as transducers 136, 138 and 140, can convert the pressure signal into electrical signals for a signal digitizer 142 (e.g., an analog to digital converter). While three transducers 136, 138 and 140 are illustrated at specific locations, a greater or fewer number of transducers may be used and may be disposed at different locations of the surface 122 or within the wellbore 128. The digitizer 142 supplies a digital form of the pressure signals to one or more processor 144 or some other data processing device. Processor 144 operates in accordance with software (which may be stored on a computer-readable storage medium) to process and decode the received signals.

As previously discussed, for mud pulse telemetry the communication module 134 generates a traveling pressure signal representative of downhole parameters measured by sensor unit 132. In an ideal system, each and every pressure pulse created downhole would propagate upstream and be easily detected by a transducer at the surface. However, drilling fluid pressure fluctuates significantly and contains noise from several sources (e.g., bit noise, torque noise, and mud pump noise, etc.) as well as self-induced interferences due to reflections and refractions when the fluid pressure propagates along the drill pipe.

In general, communication module 134 can generate and transmit a signal including a preamble waveform used to estimate the communication channel. The signal can be transmitted as a pressure signal by modulating the flow of mud using any mud pulse telemetry technique known in the art such as negative pulse, positive pulse, continuous wave, or any combination thereof. The pressure signal travels along communication path 160 toward the surface 122 of the wellbore 128. Once the signal has reached the surface 122 of the wellbore 128, the signal is measured by at least one of transducers 136, 138, and 140. Data from the signal, which can include the preamble, data collected by sensor unit 132, and/or other data symbols, can be digitized by digitizer 142 and sent (wired or wirelessly) to one or more processor 144 for recordation and/or processing. Upon receipt of the signal data, processor 144 can perform detection of the preamble waveform and/or other portions of the signal and can estimate characteristics of the communication channel. Moreover, other communication modules and sensor units disposed along the drill string 108 can receive and process the signal to estimate the communication channel.

Alternatively or in addition, flow of the drilling fluid that is pumped via mud pump 116 can be modulated at the surface 122 to generate and transmit a signal including a preamble waveform. The signal can be transmitted using mud pulse telemetry, by varying the rotation rate of the drill string 108, or by any other technique known in the art. The signal can travel along communication path 160 toward the bottom of the wellbore 128. The signal can be received by a transducer located within or proximal to sensor unit 132 or communication module 134. Data from the signal received by the transducer can be digitized and transmitted (wired or wirelessly) to a processor disposed within sensor unit 132 or communication module 134. The processor can perform detection of the preamble waveform and/or other portions of the signal and can estimate characteristics of the communication channel. Moreover, other communication modules and sensor units disposed along the drill string 108 can receive and process the signal to estimate the communication channel.

Although the illustrative optimization techniques will be described with respect to MWD/LWD using mud pulse telemetry, they can be suitably employed with any method of communication between a downhole and a surface location, as well as for communications between downhole locations. For example, the principles disclosed herein can apply to wireline communications, wireless communications, acoustic communications, structural members, or other signal transmissions where the waveform travels from downhole to surface, surface to downhole, or between communication points of the pipe, and encounters attenuation and distortion. For example, if communicating via wireline communications, the system can utilize wireline deployed as an independent service upon removal of the drill string, the drill string itself, or other conductive mechanisms for communicating. If wirelessly, a downhole transceiver (antenna) can be utilized to send data to a topside transceiver (antenna), or vice versa.

The controllers, communication modules, etc. described herein may contain all necessary software to perform the methods as described herein. Although not shown, this illustrative controllers or modules include at least one processor, a non-transitory, computer-readable storage (e.g., local memory), transceiver/network communication module, optional I/O devices, and an optional display (e.g., user interface), all interconnected via a system bus. Software instructions executable by the processor for implementing software instructions in accordance with the illustrative embodiments and methods described herein, may be stored in a local storage medium or some other computer-readable medium. Although not explicitly shown in FIG. 1, it will be recognized the controllers, modules, etc. may be connected to one or more public and/or private networks via one or more appropriate network connections via a network communication module. It will also be recognized that the software instructions comprising the methods described herein may also be loaded into local storage from appropriate storage media (e.g. a portable memory/hard drive, a CD-ROM, or the like) via wired or wireless methods.

Moreover, those ordinarily skilled in the art will appreciate that the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

Figure 2A:
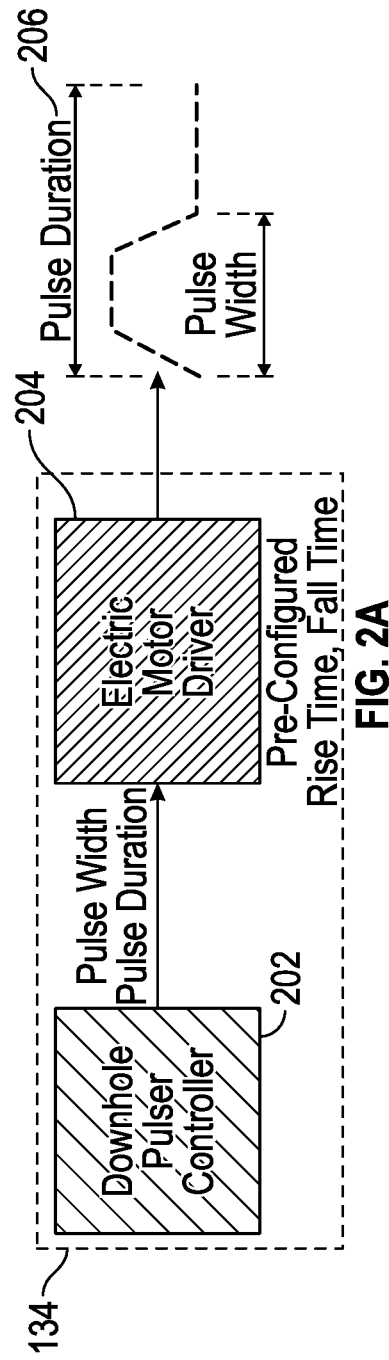
FIG. 2A is a block diagram of communication module illustrating how a downhole pulser controller generates pulsing control parameters defining pulse width and pulse duration.
Figure 2B:
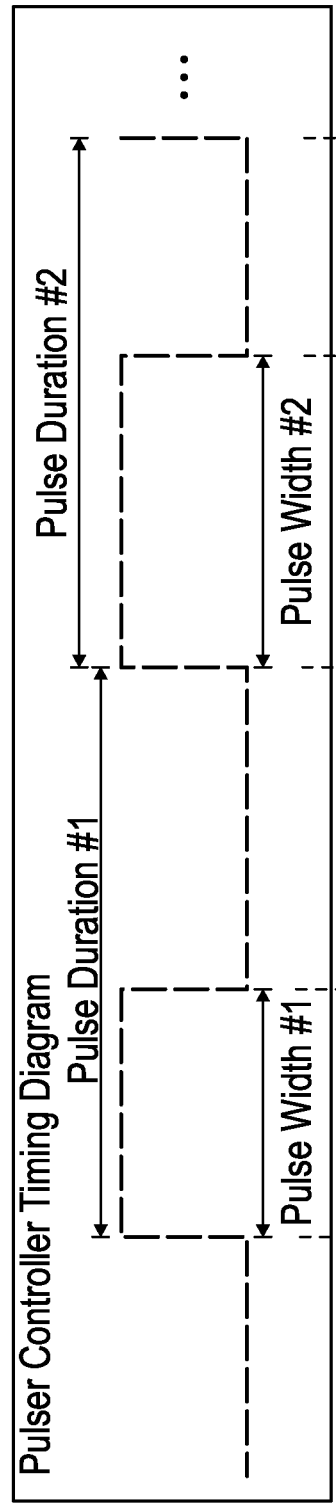
FIG. 2B illustrates timing diagram generated by the pulser controller of FIG. 2A.
Figure 2C:
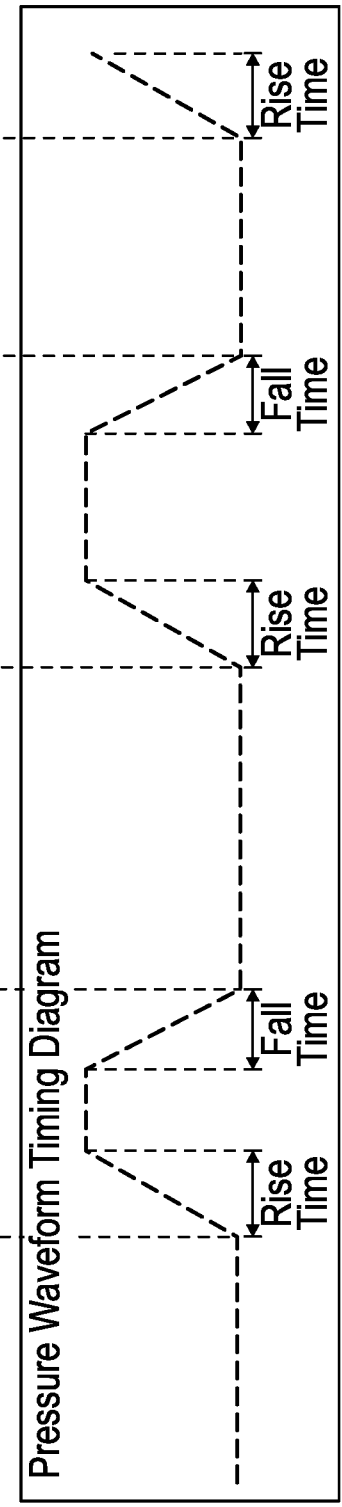
FIG. 2C is the timing diagram of the pressure waveform generated by the electric motor driver as a result of the input of the timing diagram of FIG. 2B.

FIGS. 2A-2C illustrate how pulse waveforms are generated by communication module 134 using digitally controlled pulsing parameters and the electric motor driver, according to certain illustrative embodiments of the present disclosure. FIG. 2A is a block diagram of communication module 134 illustrating how a downhole pulser controller 202 utilizes pre-configured and digitally stored pulsing control parameters defining pulse width and pulse duration. These parameters are communicated to electric motor driver 204 to then generate the rise and fall times of the resultant pulse waveform 206 having the pulse duration and pulse width as defined by the pulsing control parameters.

FIG. 2B illustrates timing diagram generated by pulser controller 134. As can be seen, the waveform includes two pulses having approximately the same pulse duration. However, width of the first pulse is smaller than the width of the second pulse. FIG. 2C is the timing diagram of the pressure waveform generated by the electric motor driver 204 (as a result of the input of the timing diagram of FIG. 2B. As can be seen, the rise and fall times of the pressure waveforms correspond to the width of the pulses in the timing diagram of FIG. 2B. However, the pressure waveforms reflect a trapezoidal shape rather than the rectangular shape of the timing diagram of FIG. 2B, which begins to show the degradation of the signal from the desired signal. As the signal is propagated along the non-linear downhole channel, the signal degradation continues until it is detected at the surface. Note this illustration is based upon certain presumptions made from the pressure generation system, and such presumptions do not include the effect of dynamic drilling conditions and other non-drilling mechanics.

Figure 3:
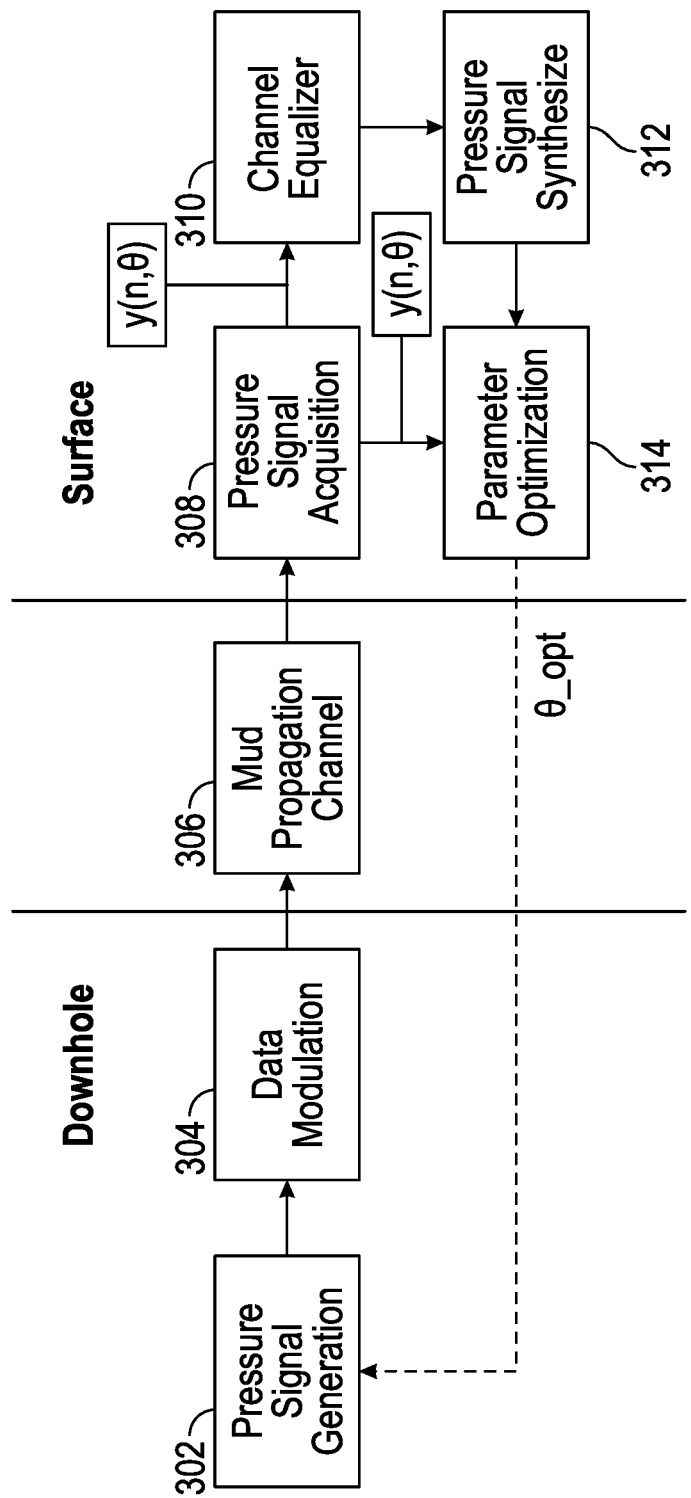
FIG. 3 is a signal flow block diagram in a mud based telemetry system according to certain illustrative methods of the present disclosure.

To correct the effects of channel non-linearity on the propagated signal, embodiments of the present disclosure determine the optimal signal generation parameters that produce the intended modulation pressure waveforms/signals at the surface. FIG. 3 is a signal flow block diagram in a mud based telemetry system according to certain illustrative methods of the present disclosure. Pressure signal generation 302 is deployed downhole (typically as a pulser) and often utilizes one or more signal generation parameters. The waveforms generated by the pulser are modulated at block 304. Without loss of generality, the following discussion focuses on mud pulse telemetry using pulse-position modulation. In certain illustrative methods described herein, the signal generation parameters used to generate pressure signal waveform are pulse duration and rise/fall time, while its duty cycle or time interval between subsequent pulses are the modulation parameters. In yet other examples, the parameter may be motor speed (how fast the pressure valve is opened/closed).

The generated pulse signals then propagate up the mud propagation channel at 306, where they are detected by surface processing circuitry at block 308. Here, $y(n, \theta_0)$ is the sampled pressure signal at the surface generated with initial signal generation parameter $\theta_0$ and we assume $y(n, \theta_0) = F_{nl}\{F_{Ch}[u(n,\theta_0)]\}$ (observed time signal) denotes the observed pressure signal subjected to the mud propagation channel effect on the transmitted pressure signal $u(n, \theta_0)$ given the initial parameter $\theta_0$. Here, $F_{nl}$ is the non-linearity effect, y is the received pressure signal at the surface, u is the transmitted pressure signal downhole, n is the time sampling index, and $\theta_0$ is the initial non-optimal parameter. At block 310, the surface system equalizes the channel under LTI channel assumption with apriori knowledge of the signal modulation used in $u(n, \theta_0)$ and produces the LTI channel estimates.

At block 314, the intended pressure signal can be expressed as $x(n,\theta_0)=F_{Ch}[u(n,\theta_0)]$, where $F_{Ch}$ is the channel function. Under an ideal LTI channel assumption, the observed pressure signal equals to the intended pressure signal. However, this is not typically the case in practice so the present disclosure's objective is to find the optimum parameter $\theta_{opt}$ that compensates for the non-linearity effect $F_{nl}\{\bullet\}$ such that $y(n, \theta_{opt})=F_{nl}\{F_{Ch}[u(n, \theta_{opt})]\}=F_{Ch}[u(n, \theta_0)]$. In certain illustrative methods, this can be done by searching for the optimum parameter using the following optimization:

$$\theta_{opt} = \arg \min_{\theta} \|y(n, \theta_0) - F_{Ch}[u(n, \theta)]\|, \quad \text{Eq. 1}$$

where arg min is arguments of the minima (that is, the element that minimizes the following objective function).

Solving the above optimization (Eq. 1) involves searching for the parameter $\theta$ that minimizes the difference between the observed pressure signal $y(n,\theta_0)$ and the synthesized one $F_{Ch}[u(n,\theta)]$. The synthesized pressure signal as a function of the parameter $\theta$ can be calculated (at block 312) from the modulation parameter (e.g., in pulse-position modulation, the modulation parameter is the pulse time delay) as well as the channel information $F_{Ch}[\bullet]$. While, in certain illustrative methods, the modulation parameter is known during training or can be obtained from the demodulation, the channel information is unknown, but can be substituted with its channel estimate $\hat{F}_{Ch}^{\theta}[\bullet]$ calculated by assuming ideal linear time-invariant channel with a given $\theta$. Hence, in an alternative method, the practical solution can be obtained by solving the optimization:

$$\theta_{opt} = \arg \min_{\theta} \left\| y(n, \theta_0) - \hat{F}_{Ch}^{\theta}[u(n, \theta)] \right\|. \quad \text{Eq. 2}$$

After the optimization of block 314 is completed, the optimum parameter $\theta_{opt}$ is then sent over the downlink channel to the downhole pulser which will then be used to compensate for the channel non-linearity. Note, in certain illustrative methods, the downhole pulser (or some other processing circuitry) may employ an iterative update of the parameter $\theta$ with a step size variable $\mu$ to reduce the effect of inaccurate channel estimate:

$$\theta_{k+1}=\theta_k+\mu(\theta_k-\theta_{opt}) \quad \text{Eq. 3}$$

The step size variable is a desired scalar factor. Thus, Equation 3 is used to iteratively update the optimized parameter to be sent to the downhole pulser.

In certain embodiments, it is possible that one iteration is sufficient to compensate for the non-linearity and this is observed when the optimal parameter is substantially equal to the first iteration, or $\theta_{opt} \approx \theta_1$. Typical implementation of the update equation in Eq. 3 defines the approximation in accordance with the update resolution. For example, if $\theta$ is calculated in milliseconds, but the update resolution is in tens of milliseconds, the range $[-5,+5]$ ms will be considered close enough in such an example. Nevertheless, when this is the case, the surface processing circuitry stops updating the parameter thru the downlink channel. It is also important to note that, in some examples, the mud propagation channel may dynamically change over the drilling duration and, as a result, the optimal compensating parameter may need to be updated using the method described above.

Figure 4:
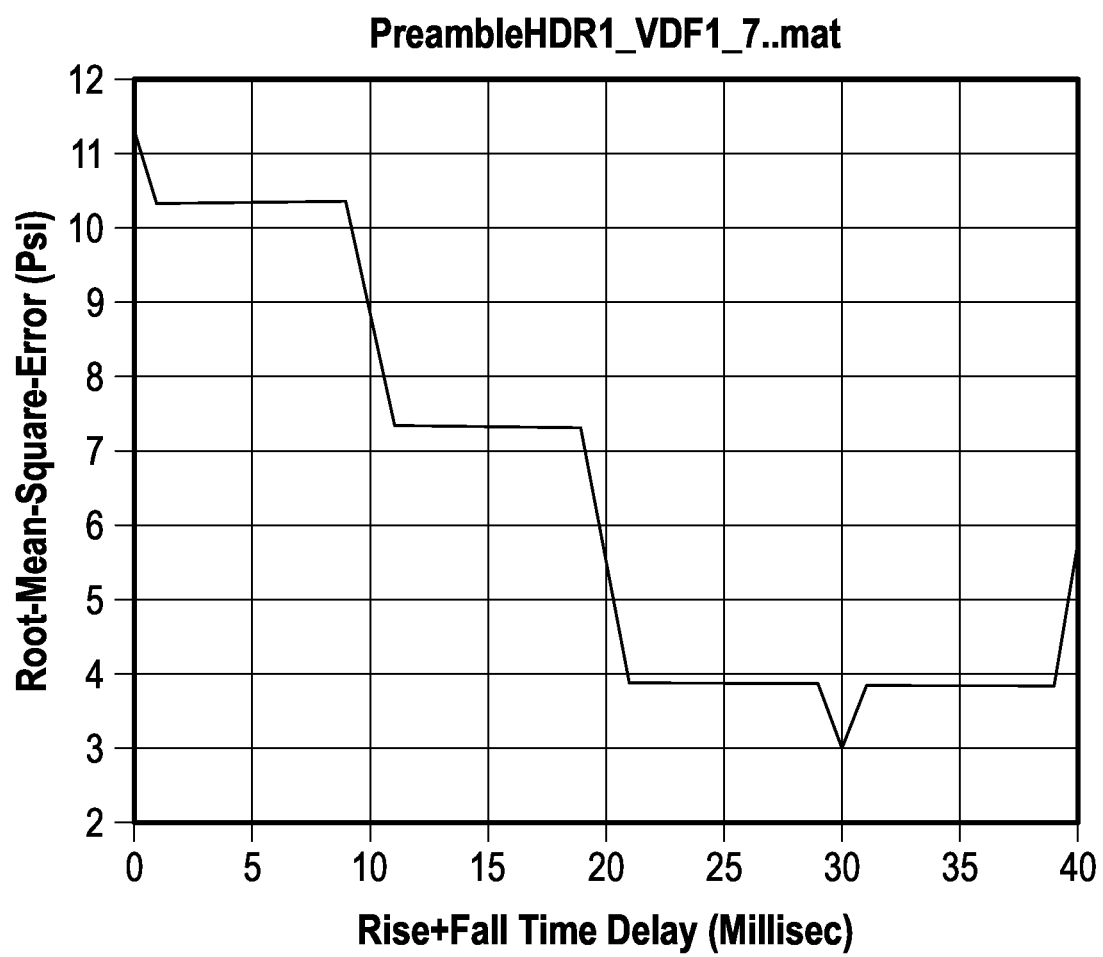
FIG. 4 is a graph of the root mean square error of an objective function with recorded pressure data obtained in a test facility.

FIG. 4 is a graph of the root mean square error of the objective function of Equation 2 with recorded pressure data obtained in a test facility. The pressure signal generation parameter used to compensate for non-linear channel in this illustrated case is rise and fall time delay for generating the pulse. In this example, the initial parameter is set at 0 ms and the optimization results show this parameter should be set at 30 ms to optimally compensate for its channel non-linearity.

Figure 5:
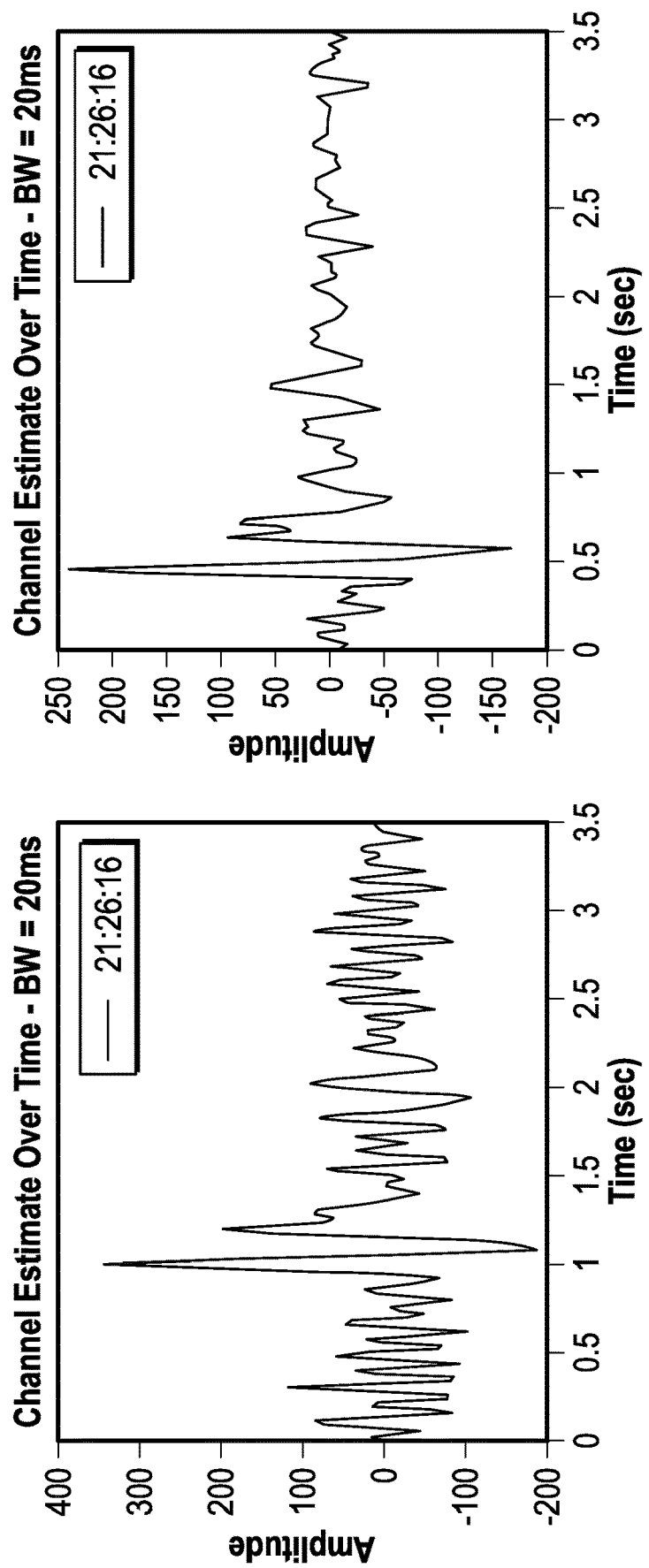
FIG. 5 is a graph of the channel impulse response plot for a non-compensated pressure signal (left) and a compensated pressure signal (right)

FIG. 5 is a graph of the channel impulse response plot for a non-compensated pressure signal (left) and a compensated pressure signal (right). The two plots are comparing the channel impulse response between the non-compensated pressure signal generation with the compensated one (generated using methods of the present disclosure). It shows various spurious peaks in channel impulse response calculated from the non-compensated signal generation and these peaks are non-existent in the channel impulse response calculated from the compensated response of the present disclosure.

As previously mentioned, other forms of data modulation may be utilized with the present disclosure. In some alternative methods, such as in a mud siren pulser application where different types of data modulation are used, the compensation for channel non-linearity follows the same approach described above with the optimization in Equation 2. Instead of searching for the rise or fall time delay, the optimization can be formulated to search for the signal frequency as the pressure signal generation parameter $\theta$. Also, the pressure signal synthesized output $\hat{F}_{Ch}^{\theta}[u(n,\theta)]$ can be calculated as a channel equalized signal at frequency $\theta$ using a variety of equalizers such as, for example, turbo equalizer, decision feedback equalizer, etc.

Figure 6:
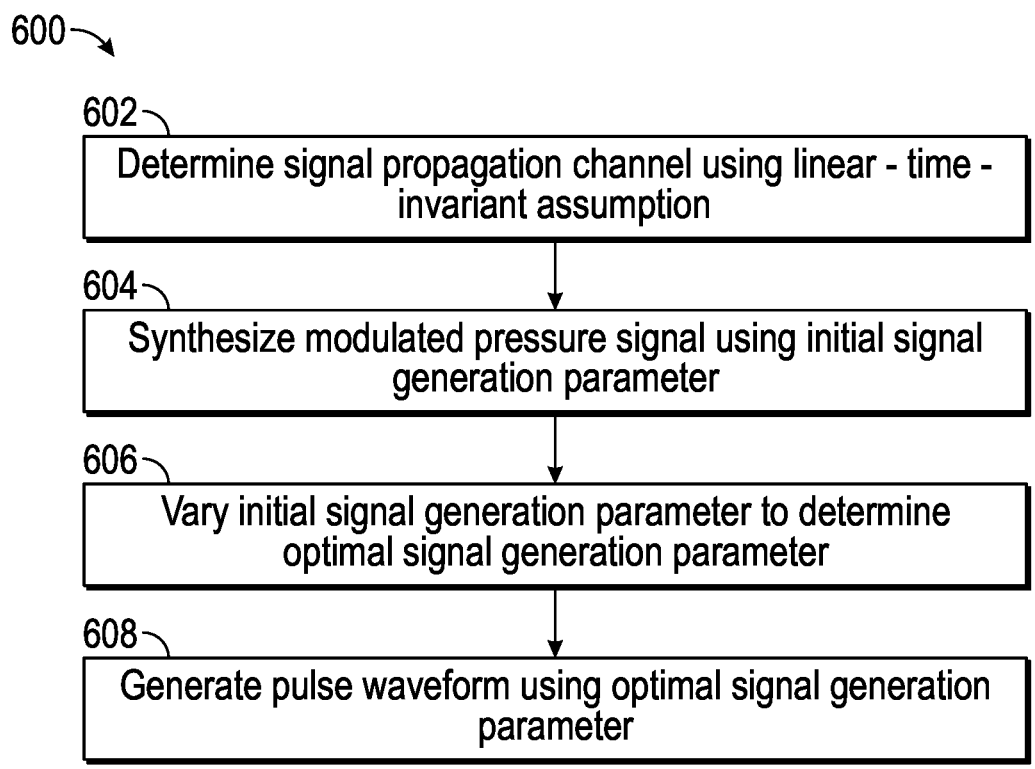
FIG. 6 is a flow chart of a generalized telemetry method to compensate for channel non-linearity effects, according to certain methods of the present disclosure.

FIG. 6 is a method to compensate for channel non-linearity effects in downhole mud pulse telemetry, according to certain illustrative methods of the present disclosure. At block 602 of method 600, the system first determines a signal propagation channel using a linear-time-invariant channel assumption and apriori knowledge of the signal modulation. At block 604, the modulated pressure signal is synthesized along the propagation channel using one or more initial signal generation parameters. Here, "initial" signal generation parameter(s) refers to any parameter that is first in time before any subsequent parameter. For example, a second parameter is considered an initial parameter when compared to a third parameter, a fourth parameter is considered an initial parameter when compared to a fifth parameter, etc.

At block 606, in response to the propagated synthesized modulated pressure signal, the system varies the initial signal generation parameter to determine one or more optimal signal generation parameter(s) using any of the illustrative methods described here. At block 608, the optimal signal generation parameters are then used to generate the pulse waveform at the downhole pulser.

The adjusted pulse width methodologies described herein may be utilized in a variety of applications, such as to conduct a variety of wellbore operations such as, for example, to perform a drilling operation or adjust a drilling operation.

Embodiments and methods described herein further relate to any one or more of the following paragraphs:

1. A computer-implemented method to compensate for channel non-linearity effects in downhole mud pulse telemetry, the method comprising determining a signal propagation channel using a linear-time-invariant channel assumption and apriori knowledge of signal modulation; using the determined signal propagation channel to synthesize a modulated pressure signal undergoing propagation based upon one or more initial signal generation parameters;

in response to the synthesized modulated pressure signal undergoing propagation, varying the initial signal generation parameters to determine one or more optimal signal generation parameters; and using the optimal signal generation parameters to generate a pulse waveform by a downhole pulser.

2. The method as defined in paragraph 1, wherein the optimal signal generation parameters are determined using an optimization technique which minimizes a discrepancy between a pressure signal observed at the surface and the synthesized modulated pressure signal.

3. The method as defined in paragraphs 1 or 2, wherein the pulse waveform is generated by the downhole pulser by transmitting the one or more optimal signal generation parameters over a downlink channel to the downhole pulser; and in response to receipt of the optimal signal generation parameters, generating the pulse waveform by the downhole pulser.

4. The method as defined in any of paragraphs 1-3, wherein the signal generation parameter is a rise and fall time delay for generating the pulse waveform.

5. The method as defined in any of paragraphs 1-4, wherein the signal generation parameter is a frequency of the pulse waveform.

6. The method as defined in any of paragraphs 1-5, wherein the signal generation parameter is a pulse duration.

7. The method as defined in any of paragraphs 1-6, further comprising iteratively updating the parameters, by the downhole pulser, with a step size variable. 8. The method as defined in any of paragraphs 1-7, further comprising adjusting a downhole operation in response to the generated pulse waveform.

9. A downhole telemetry system, comprising a mud pulse system having components to generate mud pulse waveforms; and processing circuitry coupled to the mud pulse system, the processing circuitry being operable to perform a method comprising determining a signal propagation channel using a linear-time-invariant channel assumption and apriori knowledge of signal modulation; using the determined signal propagation channel to synthesize a modulated pressure signal undergoing propagation based upon one or more initial signal generation parameters: in response to the synthesized modulated pressure signal undergoing propagation, varying the initial signal generation parameters to determine one or more optimal signal generation parameters; and using the optimal signal generation parameters to generate a pulse waveform by a downhole pulser.

10. The system as defined in paragraph 9, wherein the optimal signal generation parameters are determined using an optimization technique which minimizes a discrepancy between a pressure signal observed at the surface and the synthesized modulated pressure signal.

11. The system as defined in paragraphs 9 or 10, wherein the pulse waveform is generated by the downhole pulser by transmitting the one or more optimal signal generation parameters over a downlink channel to the downhole pulser; and in response to receipt of the optimal signal generation parameters, generating the pulse waveform by the downhole pulser.

12. The system as defined in any of paragraphs 9-11, wherein the signal generation parameter is a rise and fall time delay for generating the pulse waveform.

13. The system as defined in any of paragraphs 9-12, wherein the signal generation parameter is a frequency or duration of the pulse waveform.

14. The system as defined in any of paragraphs 9-13, further comprising iteratively updating the parameters, by the downhole pulser, with a step size variable.

15. A non-transitory computer readable medium comprising instructions which, when executed by at least one processor, causes the processor to perform a method comprising determining a signal propagation channel using a linear-time-invariant channel assumption and apriori knowledge of signal modulation; using the determined signal propagation channel to synthesize a modulated pressure signal undergoing propagation based upon one or more initial signal generation parameters; in response to the synthesized modulated pressure signal undergoing propagation, varying the initial signal generation parameters to determine one or more optimal signal generation parameters; and using the optimal signal generation parameters to generate a pulse waveform by a downhole pulser.

16. The computer readable medium as defined in paragraph 15, wherein the optimal signal generation parameters are determined using an optimization technique which minimizes a discrepancy between a pressure signal observed at the surface and the synthesized modulated pressure signal.

17. The computer readable medium as defined in paragraphs 15 or 16, wherein the pulse waveform is generated by the downhole pulser by transmitting the one or more optimal signal generation parameters over a downlink channel to the downhole pulser; and in response to receipt of the optimal signal generation parameters, generating the pulse waveform by the downhole pulser.

18. The computer readable medium as defined in any of paragraphs 15-17, wherein the signal generation parameter is a rise and fall time delay for generating the pulse waveform.

19. The computer readable medium as defined in any of paragraphs 15-18, wherein the signal generation parameter is a frequency or duration of the pulse waveform.

20. The computer readable medium as defined in any of paragraphs 15-19, further comprising iteratively updating the parameters, by the downhole pulser, with a step size variable.

Furthermore, any of the illustrative methods described herein may be implemented by a system comprising processing circuitry or a non-transitory computer readable medium comprising instructions which, when executed by at least one processor, causes the processor to perform any of the methods described herein.

Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A computer-implemented method to compensate for channel non-linearity effects in downhole mud pulse telemetry, the method comprising:
    determining a signal propagation channel using a linear-time-invariant channel assumption and apriori knowledge of signal modulation, wherein the linear-time-invariant channel assumption comprises assuming that the signal propagation channel is characterized as a convolution of an input to the signal propagation channel and channel impulse response;
    using the determined signal propagation channel to synthesize a modulated pressure signal undergoing propagation based upon one or more initial signal generation parameters;
    in response to the synthesized modulated pressure signal undergoing propagation, varying the initial signal generation parameters to determine one or more optimal signal generation parameters, wherein the one or more optimal signal generation parameters are determined using an optimization technique which minimizes a discrepancy between a pressure signal observed at the surface and the synthesized modulated pressure signal to account for the non-linearity effects of the signal propagation channel; and
    using the one or more optimal signal generation parameters to generate a pulse waveform by a downhole pulser.

2. The method as defined in claim 1, wherein the pulse waveform is generated by the downhole pulser by:
    transmitting the one or more optimal signal generation parameters over a downlink channel to the downhole pulser; and
    in response to receipt of the optimal signal generation parameters, generating the pulse waveform by the downhole pulser.

3. The method as defined in claim 1, wherein the signal generation parameter is a rise and fall time delay for generating the pulse waveform.

4. The method as defined in claim 1, wherein the signal generation parameter is a frequency of the pulse waveform.

5. The method as defined in claim 1, wherein the signal generation parameter is a pulse duration.

6. The method as defined in claim 1, further comprising iteratively updating the parameters, by the downhole pulser, with a step size variable.

7. The method as defined in claim 1, further comprising adjusting a downhole operation in response to the generated pulse waveform.

8. A system, comprising:
    one or more processor; and at least one computer-readable storage medium having stored therein instructions which, when executed by the one or more processors, cause the one or more processors to:
        determine a signal propagation channel using a linear-time-invariant channel assumption and apriori knowledge of signal modulation, wherein the linear-time-invariant channel assumption comprises assuming that the signal propagation channel is characterized as a convolution of an input to the signal propagation channel and channel impulse response;
        use the determined signal propagation channel to synthesize a modulated pressure signal undergoing propagation based upon one or more initial signal generation parameters;
        in response to the synthesized modulated pressure signal undergoing propagation, vary the initial signal generation parameters to determine one or more optimal signal generation parameters, wherein the one or more optimal signal generation parameters are determined using an optimization technique which minimizes a discrepancy between a pressure signal observed at the surface and the synthesized modulated pressure signal to account for the non-linearity effects of the signal propagation channel; and
        use the one or more optimal signal generation parameters to generate a pulse waveform by a downhole pulser.

9. The system as defined in claim 8, wherein the pulse waveform is generated by the downhole pulser by:
    transmitting the one or more optimal signal generation parameters over a downlink channel to the downhole pulser; and
    in response to receipt of the optimal signal generation parameters, generating the pulse waveform by the downhole pulser.

10. The system as defined in claim 8, wherein the signal generation parameter is a rise and fall time delay for generating the pulse waveform.

11. The system as defined in claim 8, wherein the signal generation parameter is a frequency or duration of the pulse waveform.

12. The system as defined in claim 8, further comprising iteratively updating the parameters, by the downhole pulser, with a step size variable.

13. A non-transitory computer readable medium comprising instructions which, when executed by at least one processor, causes the processor to perform a method comprising: determining a signal propagation channel using a linear-time-invariant channel assumption and apriori knowledge of signal modulation, wherein the linear-time-invariant channel assumption comprises assuming that the signal propagation channel is characterized as a convolution of an input to the signal propagation channel and channel impulse response;
    using the determined signal propagation channel to synthesize a modulated pressure signal undergoing propagation based upon one or more initial signal generation parameters; in response to the synthesized modulated pressure signal undergoing propagation, varying the initial signal generation parameters to determine one or more optimal signal generation parameters, wherein the one or more optimal signal generation parameters are determined using an optimization technique which minimizes a discrepancy between a pressure signal observed at the surface and the synthesized modulated pressure signal to account for the non-linearity effects of the signal propagation channel; and
    using the one or more optimal signal generation parameters to generate a pulse waveform by a downhole pulser.

14. The computer readable medium as defined in claim 13, wherein the pulse waveform is generated by the downhole pulser by:
    transmitting the one or more optimal signal generation parameters over a downlink channel to the downhole pulser; and in response to receipt of the optimal signal generation parameters, generating the pulse waveform by the downhole pulser.

15. The computer readable medium as defined in claim 13, wherein the signal generation parameter is a rise and fall time delay for generating the pulse waveform.

16. The computer readable medium as defined in claim 13, wherein the signal generation parameter is a frequency or duration of the pulse waveform.

17. The computer readable medium as defined in claim 13, further comprising iteratively updating the parameters, by the downhole pulser, with a step size variable.

* * * * *